(12) United States Patent
Yan et al.

(10) Patent No.: US 11,229,869 B2
(45) Date of Patent: Jan. 25, 2022

(54) AIR TREATMENT MODULE AND AIR CONDITIONER

(71) Applicant: GD MIDEA AIR-CONDITIONING EQUIPMENT CO., LTD., Guangdong (CN)

(72) Inventors: Changlin Yan, Guangdong (CN); Liangrui Chen, Guangdong (CN); Hongliang Yuan, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 284 days.

(21) Appl. No.: 16/482,879

(22) PCT Filed: Jan. 15, 2018

(86) PCT No.: PCT/CN2018/072680
§ 371 (c)(1),
(2) Date: Aug. 1, 2019

(87) PCT Pub. No.: WO2019/033698
PCT Pub. Date: Feb. 21, 2019

(65) Prior Publication Data
US 2020/0114295 A1 Apr. 16, 2020

(30) Foreign Application Priority Data
Aug. 18, 2017 (CN) .......................... 201710711685.4

(51) Int. Cl.
*B01D 46/00* (2006.01)
*B01D 46/26* (2006.01)
(Continued)

(52) U.S. Cl.
CPC ..... *B01D 46/4218* (2013.01); *B01D 46/0005* (2013.01); *B01D 46/2414* (2013.01);
(Continued)

(58) Field of Classification Search
CPC ............... B01D 46/0005; B01D 46/26; B01D 46/2414; B01D 46/0056; B01D 45/16;
(Continued)

(56) References Cited

U.S. PATENT DOCUMENTS 3,745,903 A * 7/1973 Studly ...................... G03B 5/00
396/343
7,981,189 B2 * 7/2011 Troxell .............. B01D 46/2411
55/529
(Continued)

FOREIGN PATENT DOCUMENTS

CN       201350383 Y      11/2009
CN       204006378 U      12/2014
(Continued)

OTHER PUBLICATIONS

Extended European Search Report dated Nov. 20, 2019 received in European Patent Application No. EP 18845961.4.
(Continued)

*Primary Examiner* — Minh Chau T Pham
(74) *Attorney, Agent, or Firm* — Scully Scott Murphy & Presser (57) ABSTRACT

The present disclosure provides an air processing module and an air conditioner. The air processing module includes a housing and an air processing assembly. The housing includes a base plate and a coaming formed by a periphery of the base plate extending upwardly, the coaming comprises an air inlet. The air processing assembly is mounted in the housing. The air processing assembly includes a filter canister, a support plate, and a mounting board, the filter canister is detachably mounted to the support plate, the support plate is rotatably mounted to the mounting board, the mounting board is slidably mounted in the housing along the inside and the outside of the air inlet.

20 Claims, 6 Drawing Sheets

(51) Int. Cl.
  *F24F 13/20* (2006.01)
  *F24F 13/28* (2006.01)
  *B01D 46/42* (2006.01)
  *F24F 1/0073* (2019.01)
  *B01D 46/24* (2006.01)
  *F24F 1/32* (2011.01)

(52) U.S. Cl.
  CPC ............ *B01D 46/26* (2013.01); *F24F 1/0073* (2019.02); *F24F 1/32* (2013.01); *F24F 13/20* (2013.01); *F24F 13/28* (2013.01); *B01D 2273/30* (2013.01); *B01D 2279/50* (2013.01)

(58) Field of Classification Search
  CPC .............. B01D 46/0019; B01D 50/002; B01D 46/0068; B01D 46/0058; B01D 46/446; B01D 2273/30; B01D 2279/50; F24F 1/0073; F24F 1/32; F24F 1/0007; F24F 13/00; F24F 13/20; F24F 13/28; A47L 9/20; A47L 9/127; A47L 9/1641; A47L 9/1675; A47L 9/1625
  USPC ....................... 55/472–476; 15/347, 352, 353
  See application file for complete search history.

(56) References Cited

U.S. PATENT DOCUMENTS

| | | | |
|---|---|---|---|
| 9,873,127 B2 | 1/2018 | Kim et al. | |
| 2001/0025395 A1* | 10/2001 | Matsumoto | A47L 9/1683 15/353 |
| 2006/0059872 A1* | 3/2006 | Lee | B01D 46/10 55/356 |
| 2011/0075815 A1* | 3/2011 | Brown | A61N 5/1048 378/125 |
| 2011/0299043 A1* | 12/2011 | Nishihata | B01D 46/48 353/52 |
| 2012/0151885 A1* | 6/2012 | Nishihata | B01D 46/0065 55/289 |
| 2013/0160410 A1* | 6/2013 | Kim | B01D 46/0005 55/385.4 |
| 2014/0041346 A1* | 2/2014 | Girondi | B01D 46/2411 55/480 |
| 2015/0352479 A1 | 12/2015 | Kim et al. | |
| 2016/0067642 A1* | 3/2016 | National | B01D 46/0005 55/480 |
| 2016/0074801 A1* | 3/2016 | Francis | B01D 46/444 55/485 |
| 2016/0100728 A1* | 4/2016 | Lavoie | B01D 46/2403 55/447 |
| 2016/0174803 A1* | 6/2016 | Vines | B01D 46/446 95/20 |
| 2017/0120182 A1* | 5/2017 | Kim | B03C 3/68 |

FOREIGN PATENT DOCUMENTS

| | | |
|---|---|---|
| CN | 104990137 A | 10/2015 |
| CN | 105423529 A | 3/2016 |
| CN | 106871263 A | 6/2017 |
| CN | 107327938 A | 11/2017 |
| CN | 207094808 U | 3/2018 |
| EP | 3 163 203 A1 | 5/2017 |
| JP | 2007-064607 A | 3/2007 |
| KR | 20150140964 A | 12/2015 |

OTHER PUBLICATIONS

International Search Report dated May 24, 2018 issued in PCT/CN2018/072680.

* cited by examiner

AIR TREATMENT MODULE AND AIR CONDITIONER

CROSS-REFERENCE TO RELATED APPLICATIONS

This is a national stage of International Application No. PCT/CN2018/072680, filed Jan. 15, 2018, the entire contents of which is incorporated herein by reference. No new matter is added.

FIELD

The present disclosure generally relates to the field of household appliances, and more particularly relates to an air processing module and an air conditioner.

BACKGROUND

As people's living standards continue to improve, so on the quality of life requirements continue to increase. Now the heat exchange air conditioner with single function cannot satisfy users' demands. Therefore, air conditioners with air processing function continue to appear on the market. However, in the current air conditioners, the air processing module is fixedly mounted in the air conditioner, it is inconvenient to repair or change the air processing module.

SUMMARY

The present disclosure provides an air processing module, which aims to solve the problem of that the changing of the air processing module in air conditioner is inconvenient.

In order to realize the above object, the air processing module provided by the present disclosure is applied in the air conditioner, and the air processing module includes:

a housing, including a base plate and a coaming formed by a periphery of the base plate extending upwardly, the coaming comprises an air inlet; and an air processing assembly, mounted in the housing, the air processing assembly includes a filter canister, a support plate, and a mounting board, the filter canister is detachably mounted to the support plate, the support plate is rotatably mounted to the mounting board, the mounting board is slidably mounted in the housing along the inside and the outside of the air inlet.

The support plate can be rotatably mounted to the mounting board through a bearing.

The bearing can be mounted to the mounting board, a bottom of the support plate can comprise a spindle passing through an inner hole of the bearing; and the end of the spindle connecting to the support plate can comprise a resisting ring protruding towards the side direction.

At least one guide pulley can be mounted on the mounting board, the guide pulley can abut the bottom of the support plate.

The guide pulley can be a flat pulley, and the axis of the guide pulley can extend along the radial direction of the support plate.

The bottom of the support plate can comprise a first guide groove matching to the guide pulley, and the first guide groove can be arranged along the circumferential direction of the support plate.

The guide pulley can be a gear wheel, the bottom of the first guide groove can comprise a rack engaged with the guide pulley.

A periphery of the support plate can comprise a rack, a first driving motor can be mounted on the mounting board, a shaft of the driving motor can be provided with a first driving gear, the first driving gear can engage with the rack of the support plate.

The mounting board can be mounted on the base plate, and the mounting board can match to the base plate through slot-rail fit.

The base plate of the housing can comprise a connecting block, the connecting block can comprise a sliding groove, the bottom of the mounting board can comprise a protruding rail matching to the sliding groove.

The base plate of the housing can comprise a roller, the roller can abut the bottom of the mounting board.

A plurality of rollers which are uniformly arranged at two sides of the sliding groove can be provided.

The roller can be a flat roller, and the roller can be mounted to the base plate through a mounting base.

The roller can be a gear wheel, and the bottom of the mounting board can comprise a rack engaged with the roller.

The bottom of the mounting board can comprise a second guide groove, the rack can be provided at the bottom of the second guide groove.

The mounting board can include side edges located at two sides of the protruding rail, one of the side edges of the mounting board can comprise a rack, the base plate of the housing can be provided with a second driving motor, a shaft of the second driving motor can be provided with a second driving gear, the second driving gear can engage with the rack on the mounting board.

The present disclosure further provides an air conditioner, which can include an indoor unit, an outdoor unit, and an air processing module, the air processing module can be mounted to the indoor unit and/or the outdoor unit, and the air processing module can include:

a housing, including a base plate and a coaming formed by a periphery of the base plate extending upwardly, the coaming can comprise an air inlet; and an air processing assembly, mounted in the housing, the air processing assembly includes a filter canister, a support plate, and a mounting board, the filter canister is detachably mounted to the support plate, the support plate is rotatably mounted to the mounting board, the mounting board is slidably mounted in the housing along the inside and the outside of the air inlet.

The technical proposal of the present can adjust air quality to satisfy user's requirement by setting the air processing module. The air processing module can include a housing, the housing can be internally provided with the filter canister, and the coaming of the housing can comprise the air inlet. When air flows into the housing through the air inlet, the air is filtered by a filter surface of the filter canister facing the air inlet, then the filter air is exhaust to realize the air purification effect.

Furthermore, the filter canister and the support plate can be rotatably mounted to the mounting board (that is, the filter canister and the support plate can be mounted in the housing), thus, when the filter screen of the filter canister facing the air inlet is attached with heavy accumulation of dirt or stains after filtering for a long time, the filter canister can rotate periodically, allowing the cleaner filter surface (the filter surface of the filter canister opposite to the air inlet or adjacent to the air inlet) to face the air inlet. As the filter surface with lower filter effect is replaced, the filter strength and using effect of the filter canister are improved.

In addition, the mounting board can be slidably mounted in the housing, as such, after the filter canister is used for an overlong time, the filter canister can directly slide out of the housing without disassembling the housing, then the filter canister can be cleaned and replaced. Furthermore, a user can conveniently clean, repair, or replace the filter canister.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure, and that those having ordinary skill in the art will be able to obtain other drawings based on the arrangements shown in these drawings without making inventive efforts.

Labels illustration for drawings.

| Label | Name | Label | Name |
|---|---|---|---|
| 10 | air processing module | 20 | housing |
| 21 | base plate | 211 | connecting block |
| 212 | sliding groove | 213 | protruding rail |
| 214 | roller | 22 | coaming |
| 221 | air inlet | 30 | air processing assembly |
| 31 | filter canister | 32 | support plate |
| 321 | first guide groove | 33 | mounting board |
| 331 | bearing | 332 | guide pulley |
| 333 | second guide groove | 40 | resisting ring |
| 50 | first driving motor | 51 | first driving gear |
| 60 | second driving motor | 61 | second driving gear |
| 70 | blower | 80 | mounting base |

The realization of the aim, functional characteristics, advantages of the present disclosure are further described specifically with reference to the accompanying drawings and embodiments.

DETAILED DESCRIPTION

The embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure provides an air processing module, and an air conditioner having the air processing module. The air conditioner can be a wall-mounted split machine, a wall-mounted all-in-one machine, a floor split machine, a floor all-in-one machine, etc. The present disclosure takes the split machine as an example, in detail, the present disclosure takes a cabinet as an example.

Referring to FIGS. 1-3, 5-6 and 9-10, an exemplary embodiment of the present disclosure provides an air processing module 10 including a housing 20 and an air processing assembly 30. The housing 20 can include a base plate 21 and a coaming 22 extending upwardly from a periphery of the base plate 21, wherein the coaming 22 comprises an air inlet 221. The air processing assembly 30 can be mounted in the housing 20. The air processing assembly 30 can include a filter canister 31, a support plate 32, and a mounting board 33, wherein the filter canister 31 is detachably mounted to the support plate 32, the support plate 32 can be rotatably mounted to the mounting board 33, the mounting board 33 can be mounted in the housing 20 to move, through the air inlet 221, in and out of the housing 20.

In detail, the air processing module 10 can include the housing 20, the housing 20 can include the base plate 21, and the coaming 22 can be formed to extend upwardly from the periphery of the base plate 21. The upper end of the housing 20 has an opening structure. The coaming 22 can comprise the air inlet 221. In addition, the housing 20 can be internally provided with the filter canister 31, the filter canister 31 can be detachably mounted to the support plate 32, the support plate 32 can be rotatably mounted to the mounting board 33, the mounting board 33 can be movably, for example, slidably, mounted in the housing 20, and can move out of or move into the housing 20 through the air inlet 221. If the air inlet 221 has a large aperture, the mounting board 33 can move out of or move into the housing 20 through the air inlet 221 directly. If the air inlet 221 has a small aperture where the mounting board 33 cannot move out of or move into the housing 20 through the air inlet directly), a sub-coaming of the housing 20 can comprise the air inlet 221 and the sub-coaming can be set to detachably connect to the remainder of the housing 20, such that before moving the mounting board 33 out of or into the housing 20, the sub-coaming is separated from the housing 20, such that the mounting board 33 can the move out of or into the housing 20. Another sub-coaming (a sub-coaming that does not include the air inlet 221) of the housing 20 can be set to detachably connect to the remainder of the housing 20, and when the another sub-coaming is separated from the housing 20, the mounting board 33 can be move out of or into the housing 20 through the opening provided by the removal of the another sub-coaming.

The filter canister 31 is configured to filter the air that flows into the housing 20 through the air inlet 221. The filter canister 31 can be detachably mounted to the support plate 32 by a plurality of mechanisms. For example, the filter canister 31 can be detachably mounted to the support plate 32 through a screw. In another example, the filter canister 31 can be detachably mounted to the support plate 32 through clamping. In another example, the filter canister 31 can be detachably mounted to the support plate 32 by the support plate 32 including a connecting part and the filter canister 31 is directly sleeved on the connecting part.

Further, the filter canister 31 can be rotatably mounted to the support plate 32 by a plurality of mechanisms. For example, the inner of the filter canister 31 can connect with a spindle of the filter canister 31 arranged along a central axis of the filter canister 31, and the support plate 32 can include a bearing matching with the spindle, wherein the filter canister 31 can be rotatably mounted to the support plate 32 through the matching of the spindle and the bearing. In another example, the inner of the filter canister 31 can connect with a spindle of the filter canister 31 arranged along the axis of the filter canister 31, and the support plate 32 can include a drive motor, wherein a drive spindle of the drive motor matches with the spindle of the filter canister 31 to rotate the spindle of the filter canister 31, thus the filter canister 31 can be rotatably mounted on the support plate 32. In another example, an edge of a port formed at the bottom of the filter canister 31 comprises a protruding rail (or a sliding groove), and the support plate 32 comprises a sliding (or a protruding rail) accordingly, the filter canister 31 can be rotatably mounted on the support plate 32 through the matching of the protruding rail and the sliding groove.

The mounting board 33 can be slidably mounted on the base plate 21 of the housing 20 or the mounting board 33 can be slidably mounted on the coaming 22 of the housing 20.

The mounting board 33 can be slidably mounted on the base plate 21 of the housing 20 by a plurality of mechanisms.

In one example, a protruding rail 213 (or a sliding groove 212) can be provided on the bottom of the mounting board 33, and the base plate 21 of the housing 20 can comprise the sliding groove 212 matching with the protruding rail 213 (or a protruding rail 213 matching with the protruding rail 213 can be provided to the base plate 21 of the housing 20). The filter canister 31 can be mounted on the mounting board 33, and the filter canister 31 can then be slidably mounted in the housing 20 through the matching of the protruding rail 213 and the sliding groove 212. The protruding rail 213 and the sliding groove 212 can extend along the axis of the flow of air through air inlet 221, that is, extend along the orientation in which air flows through the air inlet 221 to allow the mounting board 33 to slide into or out of the housing 20 through the air inlet 221.

In another example, the bottom of the mounting board 33 can comprise a sliding sleeve (or a sliding rod is provided on the bottom of the mounting board 33), and a sliding rod matching with the sliding sleeve is provided to the base plate 21 of the housing 20 (or the base plate 21 can comprise a sliding sleeve matching with the sliding rod). The filter canister 31 can be mounted on the mounting board 33, then the mounting board 33 can be slidably mounted in the housing 20 through the matching of the sliding sleeve and the sliding rod. The sliding rod and the sliding sleeve can extend along the axis of the flow of air through the air inlet 221, that is, extend along the orientation in which air flows through the air inlet 221 to allow the mounting board 33 to slide into or out of the housing 20 through the air inlet 221. When a cross section of the sliding rod is circular, the quantity of the sliding rod in the exemplary embodiment is plural, and the plurality of the sliding rods all extend along the same direction, and all extend along the orientation in which air flows through the air inlet 221.

The filter canister 31 can be slidably mounted on the coaming 22 of the housing 20 by a plurality of mechanisms.

In one example, each of two surfaces of the coaming 22 adjacent to the air inlet 221 can comprise a sliding groove. Two corresponding sides of the mounting board 33 can be inserted into the sliding grooves from the ends of the sliding grooves directly such that the filter canister 31 is slidably matched with the coaming 22. The filter canister 31 is mounted on the mounting board 33 and then the mounting board 33 is slidably mounted in the housing 20. The sliding groove can extend along the axis of the flow of air through the air inlet 221, that is, extend along the orientation in which air flows through the air inlet 221 to allow the mounting board 33 to slide into or out of the housing 20 through the air inlet 221.

In another example, a sliding rod can be provided to each of the two surfaces of the coaming 22 of the housing 20 adjacent to the air inlet 221 (or each of the two surfaces of the coaming 22 of the housing 20 can comprise a sliding sleeve), and each of two corresponding sides of the mounting board 33 can comprise a sliding sleeve matching with the sliding rod (or a sliding rod matching with the sliding sleeve can be provided to the each of the two corresponding sides of the mounting board 33). The filter canister 31 can be mounted on the mounting board 33, then the mounting board 33 can be slidably mounted in the housing 20 through the matching of the sliding sleeve and the sliding rod. The sliding rod can extend along the axis of the flow of air through the air inlet 221, that is, extend along the orientation in which air flows through the air inlet 221 to allow the mounting board 33 to slide into or out of the housing 20 through the air inlet 221.

The mounting board 33 can be mounted at the base plate 21 of the housing 20, and the mounting board 33 can match with the base plate 21 through the sliding groove 212 and the protruding rail 213. In the exemplary embodiment, the protruding rail 213 can be provided at the symmetry midline of the bottom of the mounting board 33.

In the exemplary embodiment, the processing module 10 can include a blower 70 arranged at the top end of the housing 20 to cover the opening at the top end of the housing 20. The blower 70 can comprise a suction opening, when the filter canister 31 is mounted in the housing 20, the bottom end of filter canister 31 is supported by the support plate 32, where the top end of the filter canister 31 contacts the suction opening of the blower 70. The top end and the bottom end of the filter canister 31 can both be closed, whereby the top end of the filter canister 31 can be connected to a periphery of the blower 70 defining the suction opening to form a seal). In operation, the air from the air inlet 221 is filtered by a filter screen of the filter canister 31, and then the filtered air is drawn by the blower 70 to flow through the top end of the filter canister 31 and the suction opening of the blower 70. In order to improve the filtration intensity, the filter screen of the filter canister 31 can be a high efficiency air particle (HEAP) screen.

The quality of the air can be adjusted through setting the air processing module 10, to satisfy user's requirement. The air processing module 10 can include the housing 20, the housing 20 can be internally provided with the filter canister 31, and the coaming 22 of the housing can comprise the air inlet 221. When the air flows into the housing 20 through the air inlet 221, the air is filter by a filtering surface of the filter screen of the filter canister 31 facing the air inlet 221, and then the filtered air is exhausted out to realize the air purification effect.

The filter canister 31 and the support plate 32 can be rotatably mounted on the mounting board 33 (that is, the filter canister 31 and the support plate 32 can be mounted in the housing 20). When the filter screen of the filter canister 31 facing the air inlet 221 is attached with heavy accumulation of dirt or stains after filtering for a significant amount of time, the filter canister 31 can be rotated (or rotated periodically), allowing a cleaner filter surface (for example, the filter surface of the filter canister 31 opposite to the air inlet 221 or adjacent to the air inlet 221) to face the air inlet 221. As the filter surface with lower filter effect is replaced, the filter strength and using effect of the filter canister 31 can be improved.

In addition, the mounting board 33 can be slidably mounted in the housing 20, therefore, when the filter canister 31 is used for an overlong time, the filter canister 31 can slide out of the housing 20 through the air inlet 221 of the housing 20 directly, without disassembling the housing 20, and then the filter canister 31 can be cleaned and changed. Therefore, it is convenient to clean, repair, or change the filter canister 31.

Furthermore, the support plate 32 can be rotatably mounted to the mounting board 33 through a bearing 331.

In one example, a spindle can be provided on the bottom of the support plate 32, a bearing 331 can be provided on the base plate 21 of the housing 20, the spindle of the support plate 32 can be inserted in an inner hole of the bearing 331 such that support plate 32 can be rotatably mounted on the base plate 21 of the housing 20. Or, a bearing 331 can be provided on the bottom of the support plate 32, a spindle can be provided on the base plate 21 of the housing 20, the spindle of the base plate 21 of the housing 20 can be inserted in an inner hole of the bearing 331 such that support plate 32 can be rotatably mounted on the base plate 21 of the housing 20. The bearing 331 can be provided at the middle of the support plate 32 to ensure that the support plate 32 rotates steadily.

In another example, referring to FIGS. 2-3 and 6-7, the bearing 331 can be mounted on the mounting board 33, a spindle that is inserted into an inner hole of the bearing 331 can be provided on the bottom of the support plate 32, and the end of the spindle connecting to the support plate 32 can comprise a resisting ring 40 protruding towards the side direction. It is to be understood that, as described above, the spindle is mounted in the inner hole of the bearing 331. So, if the spindle is directly and perpendicularly connected with the bottom of the support plate 32, the bottom of the support plate 32 would contact the end surface of the outer ring of the bearing 331 after the spindle is matched with the bearing 331 such that the rotational resistance of the support plate 32 is increased. Therefore, in the exemplary embodiment, the end of the spindle connected to the bottom of the support plate 32 can comprise the resisting ring 40. After the spindle on the support plate 32 is inserted in the inner hole of the bearing 331, the resisting ring 40 abuts the end surface of an inner ring of the bearing 331 to put up the support plate 32, as such the bottom of the support plate 32 is separated from the end surface of the outer ring of the bearing 331.

Figure 3:
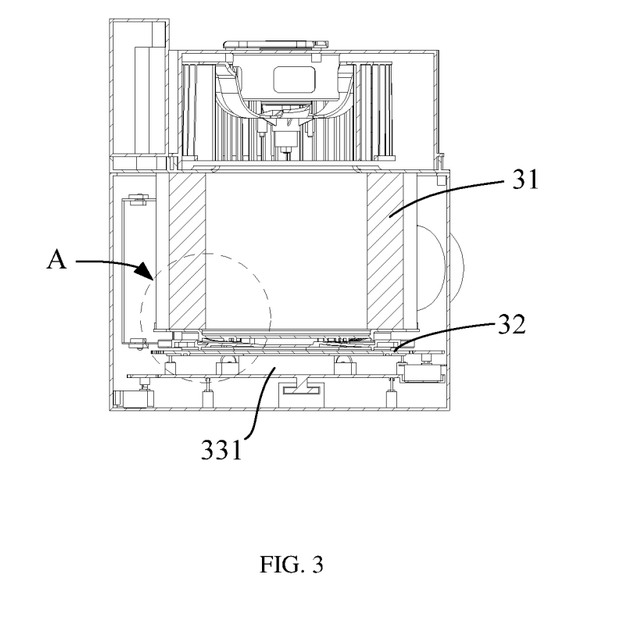
FIG. 3 is a front elevation view of the air processing module in FIG. 1 according to an exemplary embodiment.
Figure 5:
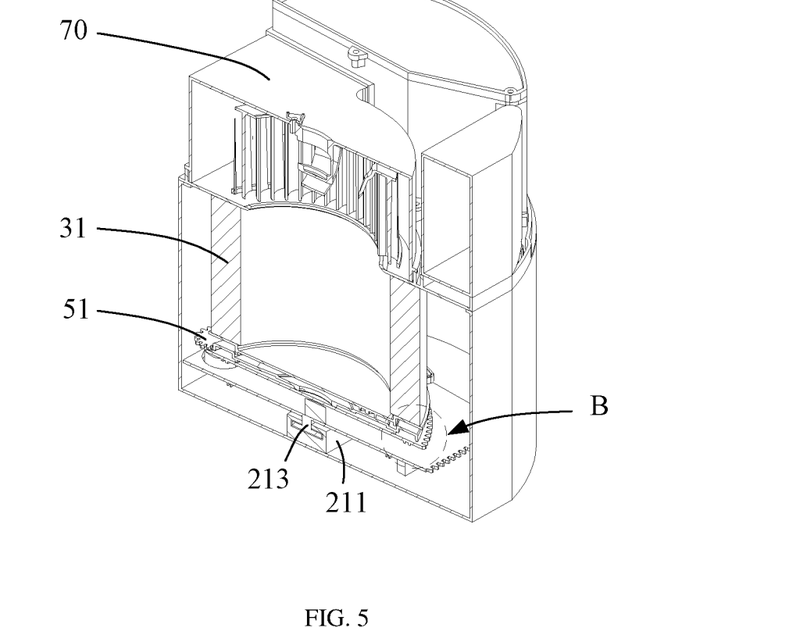
FIG. 5 is a cross section diagram of the air processing module of the present disclosure from another view.
Figure 6:
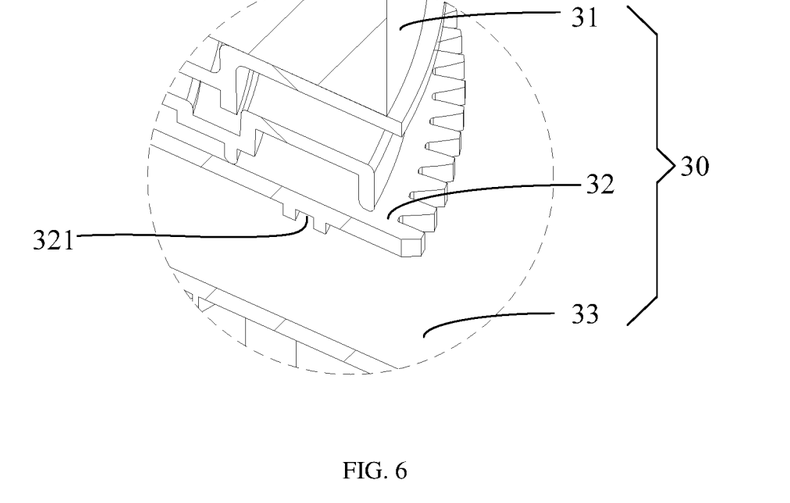
FIG. 6 is an enlarged diagram of portion B in FIG. 5.
Figure 7:
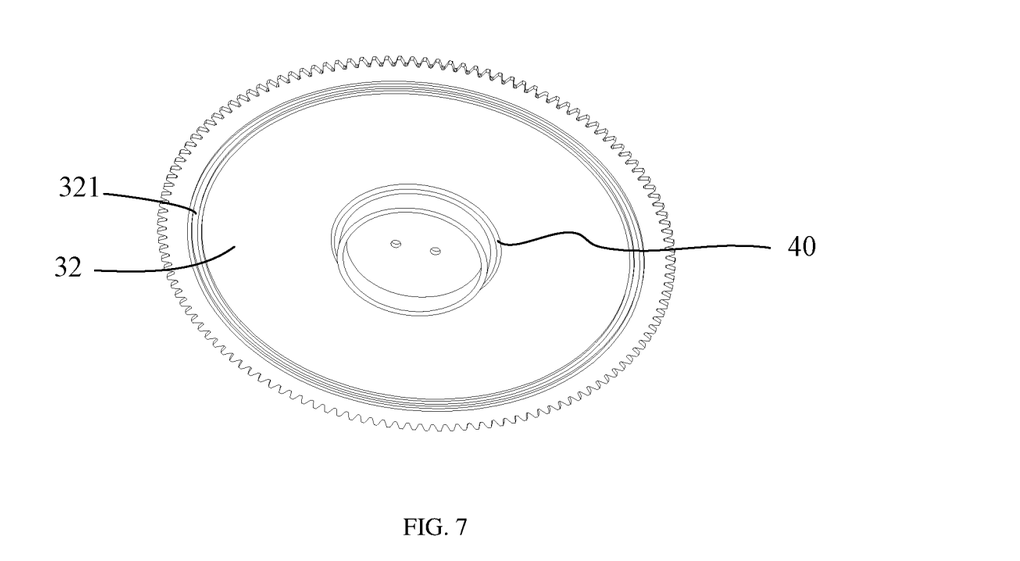
FIG. 7 is a structure diagram of the support plate.

In a further exemplary embodiment, referring to FIGS. 3, 5 and 6, the bearing 331 can be mounted on the mounting board 33, a spindle can be provided to the bottom of the support plate 32 and be inserted into the inner hole of the bearing 331, a connecting portion of the spindle and the support plate 32 can have a chamfer structure. As described above, the spindle can be mounted in the inner hole of the bearing 331. So, if the spindle is directly and perpendicularly connected with the bottom of the support plate 32, the bottom of the support plate 32 would contact the end surface of the outer ring of the bearing 331 after the spindle matching with the bearing 331 such that the rotational resistance of the support plate 32 is increased. Therefore, in the exemplary embodiment, the connecting portion of the spindle and the support plate 32 is set to have the chamfer structure, that is, the connecting end of the spindle is gradually enlarged. After the spindle is inserted in the inner hole of the bearing 331, the gradually enlarged portion of the spindle can put up the support plate 32 such that the bottom of the support plate 32 is separated from the end surface of the outer ring of the bearing 331. As an example, the chamfer structure can be a circular chamfer.

Figure 4:
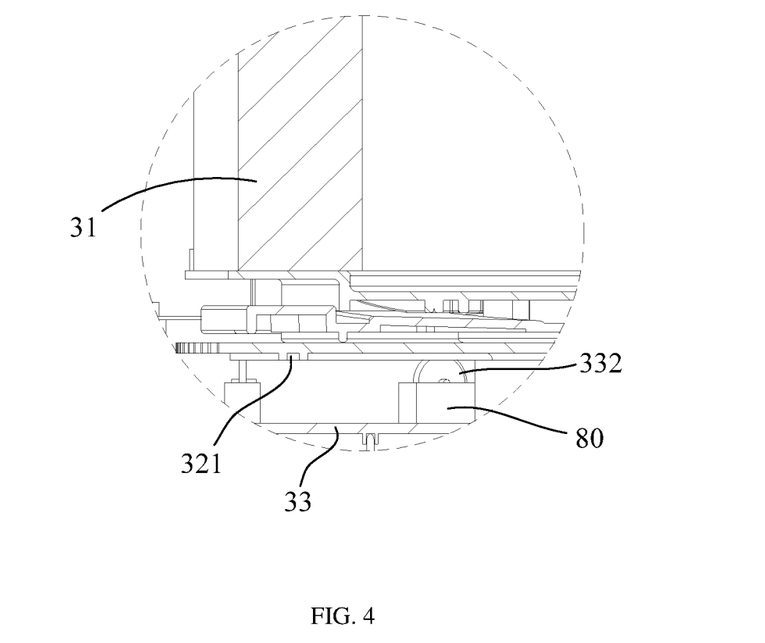
FIG. 4 is an enlarged diagram of portion A in FIG. 3.

In another exemplary embodiment, referring to FIGS. 3-4, at least one guide pulley 332 can be mounted on the mounting board 33, the guide pulley 332 supports the bottom of the support plate 32. The support plate 32 is supported by the guide pulley 332 to ensure that the support plate 32 can rotate steadily during the rotating process with less noise generated. Further, the rolling direction of the guide pulley 332 is consistent with the rotating direction of the support plate 32 such that the guide pulley 332 not only supports the support plate 32 but also has a function of guiding the rotation of the support plate 32. The guide pulley 332 can be directly mounted on the mounting board 33, or mounted on the mounting board 33 through a support element. In one example, the mounting board 33 can comprise a receiving groove, the guide pulley 332 can be received in the receiving groove through the spindle. When there are a plurality of the guide pulleys 332, the plurality of guide pulleys 332 can be uniformly arranged along the circumferential direction of the support plate 32. The guide pulley 332 can also be mounted on the mounting board 33, and the guide pulley 332 supports the mounting board 33. In addition, the guide pulley 332 can be a spherical roller, a drum-type roller, an annular roller, or a flat pulley.

In the case where the guide pulley 332 is the flat pulley, the axis of the guide pulley 332 extends along the radial direction of the support plate 32. The guide pulley 332 can be mounted on the mounting board 33 through a mounting base 80. In detail, the mounting base 80 can be provided to the mounting board 33, the mounting base 80 is internally provided with the bearing, and two sides of the flat pulley can comprise a spindle, then the flat pulley is rotatably connected with the mounting base 80 through the flat pulley and the spindle. During the rotating process of the guide pulley 332, there is a friction between the guide pulley 332 and the support plate 32. Therefore, the guide pulley 332 in the exemplary embodiment is set to be the flat pulley, which aims to reduce the contacting area of the guide pulley 332 and the support plate 32, and the friction between the guide pulley 332 and the support plate 32 is decreased. In addition, the axis of the guide pulley is set to extend along the radial direction of the support plate 32, thus it is convenient for the guide pulley 332 to slide on the support plate 32.

In another exemplary embodiment, referring to FIGS. 3-4, 10 and 11, the bottom of the support plate 32 can comprise a first guide groove 321 matching to the guide pulley 332, and the first guide groove 321 can be arranged along the circumferential direction of the support plate 32. It is to be understood that, the bottom of the support plate 32 can comprise the first guide groove 321, the first guide groove 321 can extend along the circumferential direction of the support plate 32, that is, the first guide groove 321 can have an annular structure arranged on the bottom of the support plate 32. Furthermore, during the rotating process, the support plate 32 can steadily rotate along the circumferential direction through the matching of the guide pulley 332 and the first guide groove 321, and less noise is generated.

In another exemplary embodiment, referring to FIGS. 3 and 6, the guide pulley 332 can be a gear wheel, the bottom of the first guide groove 321 can comprise a rack engaged with the guide pulley 332. It is to be understood that, in the exemplary embodiment, the guide pulley 332 is set to be the gear wheel to match with the rack in the first guide groove 321 such that the support plate 32 is driven to rotate steadily, furthermore, less noise is generated. The gear wheel can be a straight gear wheel, a herringbone gear wheel, or a one-way gear wheel, etc. It is to be noted that the bottom of the first guide groove 321 is configured to abut the bottom of a roller 214.

Figure 1:
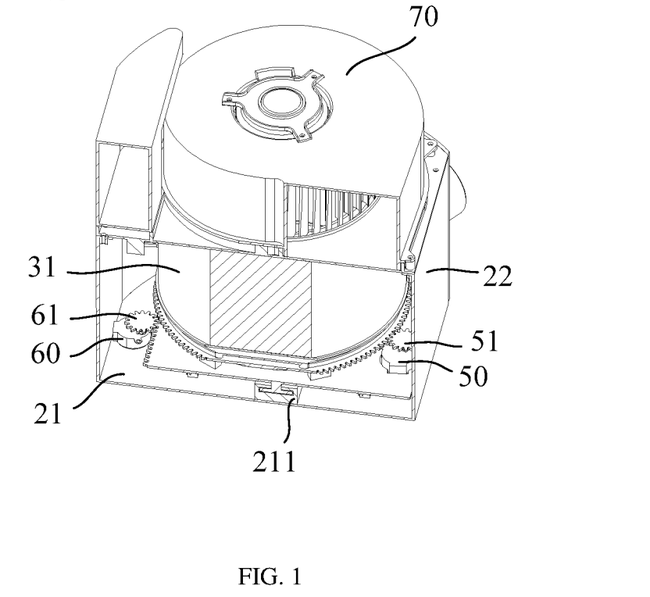
FIG. 1 is a partial cross section diagram of the air processing module of the present disclosure.
Figure 2:
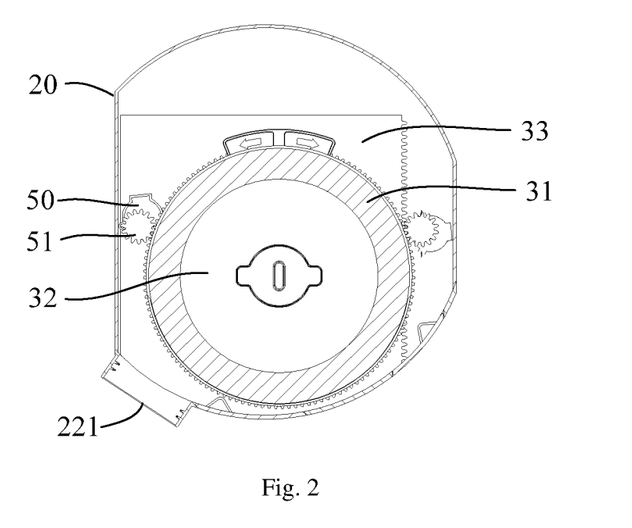
FIG. 2 is top plan view of the cross section of the air processing module of the present disclosure according to an exemplary embodiment.

In another exemplary embodiment, referring to FIG. 2, the periphery of the support plate 32 can comprise a rack, a first driving motor 50 can be mounted on the mounting board 33, a first driving gear 51 can be provided to a shaft of the driving motor 50 to engage with the rack on the periphery of the support plate 32.

When the first driving motor 50 is operated, the support plate 32 rotates under the driving of the first driving gear 51 such that the support plate 32 is controlled to rotate.

Figure 8:
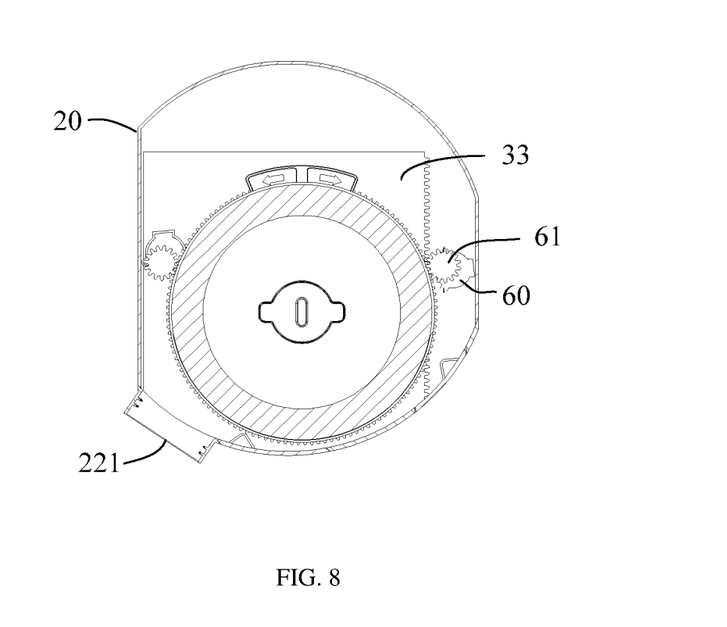
FIG. 8 is top plan view of the cross section of the air processing module of the present disclosure according to another exemplary embodiment.
Figure 9:
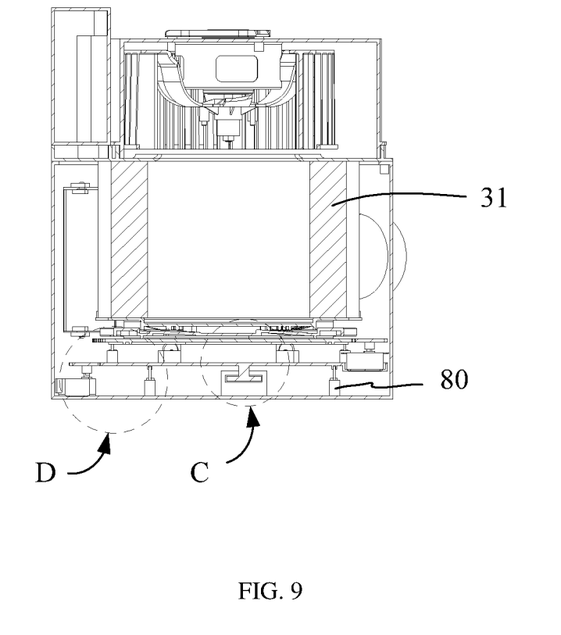
FIG. 9 is a front elevation view of the air processing module in FIG. 1 according to another exemplary embodiment.
Figure 10:
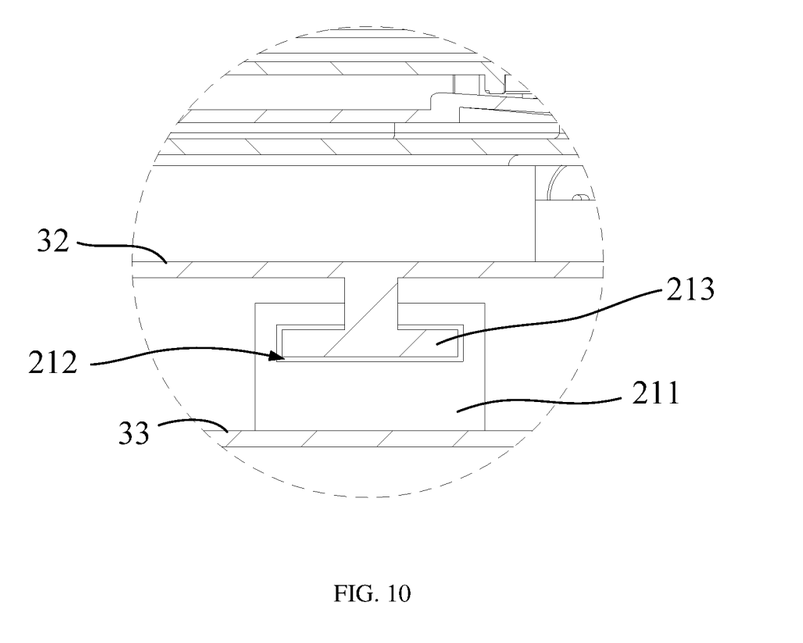
FIG. 10 is an enlarged diagram of portion C in FIG. 9.

Referring to FIGS. 8 and 10, in another exemplary embodiment, a connecting block 211 can be provided on the base plate 21 of the housing 20, the connecting block 211 can comprise a sliding groove 212, a protruding rail 213 can be provided on the bottom of the mounting board 33 to match the sliding groove 212. If the sliding groove 212 is directly formed in the base plate 21 of the housing 20, the whole base plate 21 should be set to have a large thickness, causing a waste of material and increasing the difficulty for manufacturing the base plate 21. Therefore, in the exemplary embodiment, the connecting block 211 can be provided on the base plate 21, and then the connecting block 211 can directly match with the sliding groove 212.

In another exemplary embodiment, referring to FIGS. 8-11, the roller 214 can be provided directly or indirectly to the base plate 21 of the housing 20, and the roller 214 can support the bottom of the mounting board 33 to ensure the support plate 32 rotates steadily during the rotating process and less noise is generated. During the process of the mounting board 33 sliding on the roller 214, the rolling direction of the roller 214 is consistent with the sliding direction of the mounting board 33. The roller 214 can be a spherical roller 214, a drum-type roller 214, an annular roller 214, or a flat roller 214. The roller 214 can be directly mounted on the base plate 21, or mounted on the base plate 21 through a supporter. The base plate 21 can comprise a receiving groove, the roller 214 can be received in the receiving groove through the spindle. The roller 214 can be provided on the mounting board 33, and the roller 214 can be supported by the base plate 21 of the housing 20.

Furthermore, there can be a plurality of rollers 214 which are uniformly arranged at two sides of the sliding groove 212. It should be understood that, the plurality of rollers 214 are respectively arranged at two sides of the sliding groove 212 to guide and support the mounting board 33, thus the mounting board 33 can slide steadily during the sliding process. The rollers 214 at the same side of the sliding groove 212 are arranged in line, or in dislocation mode.

In another exemplary embodiment, referring to FIGS. 8-11, the roller 214 can be a flat roller mounted to the base plate 21 through a mounting base 80. Specifically, a plurality of mounting bases 80 can be arranged to the base plate 21 of the housing 20, each of the plurality of the mounting bases 80 can be internally provided with a bearing. Similarly, a spindle can be provided to each of the two sides of the flat roller, and the flat roller can be rotatably connected with the mounting base through the spindle. During the rotating process of the roller 214, there is friction between the roller 214 and the support plate 32, therefore, the roller 214 in the exemplary embodiment is set to be the flat roller, which aims to reduce the contacting area of the roller 214 and the support plate 32.

Figure 11:
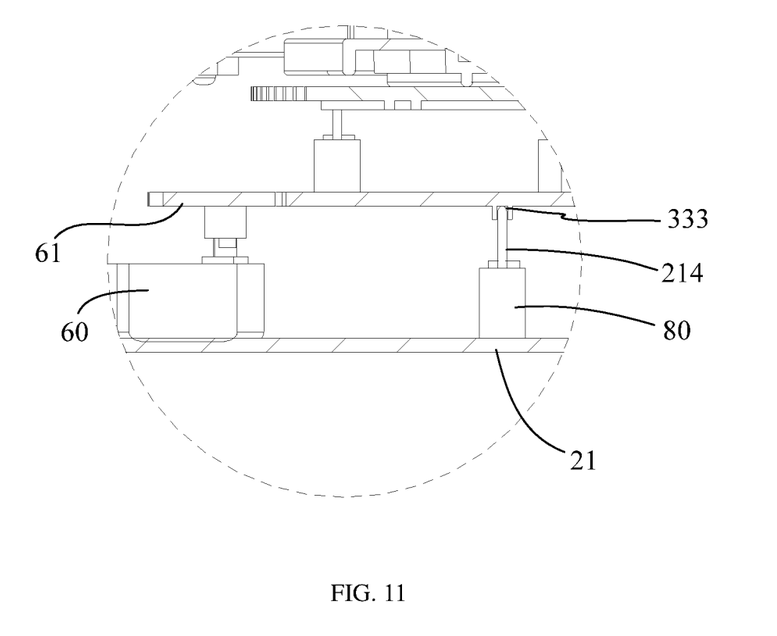
FIG. 11 is an enlarged diagram of portion D in FIG. 9.

In another exemplary embodiment, referring to FIGS. 10-11, the roller 214 can be a gear wheel, and the bottom of the mounting board 33 can comprise a rack engaged with the roller 214. The gear wheel can be configured to match with the rack arranged on the bottom of the mounting board 33, thus the mounting board 33 can be driven to move much more steadily with less noise generated.

Furthermore, the bottom of the mounting board 33 can comprise a second guide groove 333, and the rack can be arranged at the bottom of the second guide groove 333. During the rotating process of the roller 214 engaged with the rack, the wall of the second guide groove 333 can limit the position of the rack, further preventing the mounting board 33 from shifting in the moving process, so as to improve the stability of the mounting board 33 when moving. It is to be noted that, the bottom surface of the second guide groove supported by the roller 214 can be regarded as the bottom of the groove.

In another preferable exemplary embodiment, referring to FIGS. 8-11, the mounting board 33 can include side edges located at two sides of the protruding rail 213, one of the side edges of the mounting board 33 can comprise a rack, a second driving motor 60 can be provided on the base plate 21 of the housing 20, a second driving gear 61 can be provided on a shaft of the second driving motor 60, and the second driving gear 61 can engage with the rack on the mounting board 33.

In detail, the protruding rail 213 can be provided on the bottom of the mounting board 33, and the mounting board 33 can have two side edges respectively located at two sides of the protruding rail 213 (the two side edges extend along the length direction of the protruding rail 213), any one of the side edges of the mounting board 33 can comprise the rack. In addition, the second driving motor 60 can be provided to the base plate 21 of the housing 20, and the second driving motor 60 can be adjacent to the side edge (the side edge having the rack) of the mounting board 33. The second driving gear 61 can be provided to the drive shaft of the second driving motor 60 to engage with the rack on the mounting board 33. When the second driving motor 60 operates, the mounting board 33 moves in or out of the housing 20 under the driving of the protruding rail 213, the sliding groove 212, and the second driving gear 61, such that the support plate 32 is controlled to move.

The foregoing description merely depicts some embodiments and therefore is not intended to limit the scope of the invention disclosed in the present application. An equivalent structural or flow changes made by using the content of the specification and drawings of the present application, or any direct or indirect applications of the disclosure on any other related fields shall all fall in the scope of the invention disclosed in the present application.

What is claimed is:

1. An air processing module comprising:
a housing comprising:
   a base plate; and
   a coaming extending upwardly from a periphery of the base plate, wherein the coaming comprises an air inlet; and
an air processing assembly comprising:
   a support plate configured to support a filter canister and to at least rotate the filter canister within the housing from a first position where a first filter surface of the filter canister is exposed to air flowing into the housing through the air inlet to a second position where a second filter surface of the filter canister is exposed to air flowing into the housing through the air inlet; and
   a mounting board configured to support the support plate and to move at least a portion of the support plate supporting the filter canister to move the filter canister into and out of the housing.

2. The air processing module according to claim 1, comprising:
a bearing,
wherein the support plate is rotatably mounted to the mounting board through the bearing.

3. The air processing module according to claim 2,
wherein the bearing is mounted to the mounting board, and
wherein the air processing module comprises:
   a spindle provided to a bottom of the support plate, wherein the spindle is configured to pass through an inner hole of the bearing; and
   a resisting ring provided on an end of the spindle connected to the bottom of the support plate, wherein the resisting ring protrudes towards a side direction of the support plate.

4. The air processing module according to claim 1, comprising:
at least one guide pulley mounted on the mounting board, wherein the guide pulley is configured to support a bottom of the support plate.

5. The air processing module according to claim 4,
wherein the at least one guide pulley comprises at least one flat pulley, and
wherein an axis of the guide pulley extends along a radial direction of the support plate.

6. The air processing module according to claim 4,
wherein the bottom of the support plate comprises a first guide groove matching the at least one guide pulley, and
wherein the first guide groove is arranged along a circumferential direction of the support plate.

7. The air processing module according to claim 6,
wherein the at least one guide pulley comprises at least one gear wheel, and
wherein a bottom of the first guide groove comprises a rack engaged with the gear wheel.

8. The air processing module according to claim 1,
wherein a periphery of the support plate comprises a rack, and
wherein the air processing module comprises:
   a first driving motor mounted on the mounting board; and
   a first driving gear provided to a shaft of the driving motor to engage with the rack on the periphery of the support plate,
   wherein the first driving motor is configured to rotate the shaft and the first driving gear provided to the shaft to in turn engage the rack on the periphery of the support plate to rotate the support plate.

9. The air processing module according to claim 1,
wherein the mounting board is mounted on the base plate, and
wherein the mounting board matches to the base plate through slot-rail fit.

10. The air processing module according to claim 9,
wherein the base plate of the housing comprises a connecting block,
wherein the connecting block comprises a sliding groove, and
wherein the bottom of the mounting board comprises a protruding rail matching the sliding groove.

11. The air processing module according to claim 10,
wherein the base plate of the housing comprises a roller, and
wherein the roller abuts the bottom of the mounting board.

12. The air processing module according to claim 11, comprising:
a plurality of rollers uniformly arranged at two sides of the sliding groove.

13. The air processing module according to claim 11, comprising:
a mounting base,
wherein, the roller is a flat roller, and
wherein the roller is mounted to the base plate through the mounting base.

14. The air processing module according to claim 11,
wherein the roller comprises a gear wheel, and
wherein a bottom of the mounting board comprises a rack engaged with the roller.

15. The air processing module according to claim 14,
wherein the bottom of the mounting board comprises a second guide groove, and
wherein the rack is formed at the bottom of the second guide groove.

16. The air processing module according to claim 10,
wherein the mounting board comprises side edges located at two sides of the protruding rail,
wherein one of the side edges of the mounting board comprises a rack, and
wherein the air processing module comprises a second driving motor,
   wherein a shaft of the second driving motor is provided with a second driving gear, and
   wherein the second driving gear engages with the rack on the mounting board.

17. The air processing module according to claim 1, further comprising a blower having a suction opening,
wherein the blower at least partially overlaps an opening of the housing, and
wherein the suction opening is in fluid communication with an end of the filter canister, such that activation of the blower generates air flow into the filter canister through the air inlet.

18. An air conditioner comprising:
an indoor unit;
an outdoor unit; and
an air processing module mounted to the indoor unit and/or the outdoor unit, wherein the air processing module comprises:
  a housing comprising:
    a base plate; and
    a coaming extending upwardly from a periphery of the base plate, wherein the coaming comprises an air inlet; and
  an air processing assembly comprising:
    a support plate configured to support a filter canister and to at least rotate the filter canister within the housing from a first position where a first filter surface of the filter canister is exposed to air flowing into the housing through the air inlet to a second position where a second filter surface of the filter canister is exposed to air flowing into the housing through the air inlet; and
    a mounting board configured to support the support plate and to move at least a portion of the support plate supporting the filter canister to move the filter canister into and out of the housing.

19. The air conditioner according to claim 18,
wherein the mounting board is mounted on the base plate, and
wherein the mounting board matches to the base plate through slot-rail fit.

20. The air conditioner according to claim 19,
wherein the base plate of the housing comprises a connecting block,
wherein the connecting block comprises a sliding groove,
wherein the bottom of the mounting board comprises a protruding rail matching the sliding groove, and
wherein the air conditioner comprises a plurality of rollers uniformly arranged at two sides of the sliding groove.

* * * * *